United States Patent
Griffin, Jr. et al.

(10) Patent No.: US 8,527,782 B2
(45) Date of Patent: Sep. 3, 2013

(54) POWER HUB

(75) Inventors: Paul P. Griffin, Jr., Nashville, TN (US);
Beat Zenerino, Nashville, TN (US);
Cameron E. Boone, Nashville, TN (US); Lester V. Marks, Raleigh, NC (US); Mark David Rowan, Franklin, TN (US); David M. Reynolds, Mt. Juliet, TN (US)

(73) Assignee: Griffin Technology, Inc., Nashville, TN (US)

( * ) Notice: Subject to any disclaimer, the term of this patent is extended or adjusted under 35 U.S.C. 154(b) by 874 days.

(21) Appl. No.: 12/607,951

(22) Filed: Oct. 28, 2009

(65) Prior Publication Data

US 2010/0146307 A1    Jun. 10, 2010

Related U.S. Application Data

(60) Provisional application No. 61/110,403, filed on Oct. 31, 2008.

(51) Int. Cl.
*G06F 1/26* (2006.01)
*G06F 13/00* (2006.01)

(52) U.S. Cl.
USPC ............................ 713/300; 713/340; 710/306

(58) Field of Classification Search
USPC .......................... 713/300–340; 710/300–306
See application file for complete search history.

(56) References Cited

U.S. PATENT DOCUMENTS

| | | | | |
|---|---|---|---|---|
| 6,204,574 | B1 * | 3/2001 | Chi | 307/66 |
| 6,614,206 | B1 * | 9/2003 | Wong et al. | 320/136 |
| 6,636,015 | B1 * | 10/2003 | Levine et al. | 320/105 |
| 6,665,801 | B1 * | 12/2003 | Weiss | 713/300 |
| 7,017,055 | B1 * | 3/2006 | Ho | 713/300 |
| 7,346,728 | B1 * | 3/2008 | Jackson | 710/313 |
| 7,523,338 | B2 * | 4/2009 | Fu et al. | 713/340 |
| 7,657,290 | B2 * | 2/2010 | Veselic et al. | 455/572 |
| 7,701,168 | B2 * | 4/2010 | Thijssen | 320/111 |
| 7,899,970 | B2 * | 3/2011 | Mori | 710/313 |
| 7,952,231 | B1 * | 5/2011 | Zansky et al. | 307/59 |

* cited by examiner

*Primary Examiner* — Tim T Vo
*Assistant Examiner* — Trisha Vu
(74) *Attorney, Agent, or Firm* — Hornkohl Intellectual Property Law, PLLC; Jason L. Hornkohl

(57) ABSTRACT

A USB hub utilizes an external power supply connection and rechargeable battery to provide a fully functional USB hub that provides portable backup power for USB devices. The hub includes a housing with a host connector that is adapted to be coupled to a host. Device connectors are also positioned on the housing that are adapted to be coupled to electronic devices. A hub circuit enables USB communications between the devices and host connected to the hub. The rechargeable battery is selectively charged from the host or external power supply connection. A microcontroller controls the hub circuitry such that power is provided to the hub circuit and the device connectors from an external power source or host if available or the rechargeable battery if they are not.

16 Claims, 5 Drawing Sheets

POWER HUB

CROSS-REFERENCES TO RELATED APPLICATIONS

The present invention is based upon and claims priority from co-pending U.S. Provisional Patent Application No. 61/110,403 filed Oct. 31, 2008.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

USB hubs are used to provide additional USB connections to a single USB input port. Prior art USB hubs rely on power from a USB host connected to the hub. These hubs allow a single USB port to be connected to multiple USB devices. Unfortunately, the number of USB devices that can be supported is limited by the output current of the host device. In addition, the hub cannot be used to power the USB devices when it is not connected to the host device. Therefore, what is needed is an improved USB hub.

BRIEF SUMMARY OF THE INVENTION

An embodiment of the invention is directed toward a USB power hub that includes a housing having a USB host connector positioned on the housing. The housing includes an upper housing and a lower housing mounted on a central frame. The USB host connector is adapted to be coupled to a USB host device and receive a host power supply voltage from the host device. At least two USB device connectors are positioned on the housing. Each of the device connector is adapted to be coupled to a downstream USB device and provide a power supply voltage to the device. A hub circuit connects both of the device connectors to the host connector such that a host device connected to the host connector can communicate digital data with an electronic device connected to one of the device connectors. A rechargeable battery is contained within the housing. The power hub has an external power supply connection. A microcontroller controls the hub so that the hub uses the external power supply connection to power the hub circuit, recharge the rechargeable battery and power any the electronic devices coupled to the device connectors when the external power supply connection is connected to an external power supply. If no external power supply connection is available, the microcontroller controls the hub such that power for the hub circuit, rechargeable battery and device connectors is provided from a host device if a host device is connected to the host connector. If no host or external power is available, power for an electronic device connected to one of the device connectors is provided from the rechargeable battery. A boost converter converts the battery voltage into the downstream device voltage. The rechargeable battery is only charged from a host device connected to the host connector when a power current drawn by any electronic devices connected to the device connectors is below a specified threshold. A battery bypass circuit is used to remove the battery from the power supply circuit when necessary. An LED display and button are used to display a charge level for the rechargeable battery to user when the button is pressed.

Another embodiment of the present invention is directed toward a method of operating a hub having a host connector, at least two device connectors, a rechargeable battery and an external power supply connection contained in a housing. The hub enables digital communications between a host connected to the host connector and at least two devices connected to the device connectors. In accordance with the method, the hub detects if external power is available from the external power supply connection and, if external power is available, powers the hub, charges the rechargeable battery and powers any devices connected to the device connectors with the external power. If no external power is available, the hub detects if host power is available from the host connector. If host power is available, the hub powers the hub, charges the rechargeable battery and powers any devices connected to the device connectors with the host power. If no external power or host power is available, the hub and any devices connected to the device connectors are powered with power from the rechargeable battery. The hub is placed into a sleep mode if a charge level of the rechargeable battery falls below a threshold level and no external power or host power is available. A current level provided to downstream devices connected to the device connectors is monitored by the hub and charging of the rechargeable battery is stopped when the current level exceeds a threshold level. A charge level of the rechargeable battery is displayed in response to a user input.

DETAILED DESCRIPTION OF THE INVENTION

The present invention is directed toward a power hub that uses a USB 2.0 hub and a Lithium-Ion backup battery pack in a novel device that operates in a number of different modes. In addition to providing portable power for emergency charging of portable devices having USB port, the hub's Lithium-ion battery pack also provides additional power for downstream devices when the hub is operating as a USB Hub.

Figure 1A:
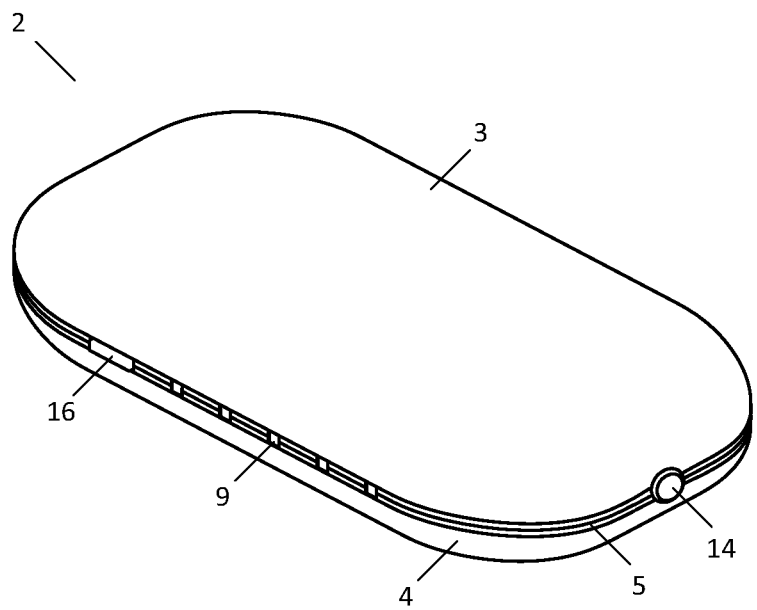
FIGS. 1(a) and (b) are an exploded and assembled view of a power hub constructed in accordance with an embodiment of the present invention.

Referring now to FIGS. 1(a) and (b), an assembled 1(a) and exploded 1(b) view of a power hub constructed in accordance with an embodiment of the present invention is shown. The exterior of the power hub 2 consists of an upper 3 and lower 4 housing that are mounted on a center frame 5 to enclose the circuit board 7 of the power hub 2. The upper 3 and lower 4 housing combine to create a power hub 2 having a sleek exterior as shown in FIG. 1(a).

A male USB host connector 6 on a cord extends from the lower housing 4. A curved indentation 13 on the lower housing 4 is shaped to receive the cord and male USB host connector 6 so that they can be securely mounted on the lower housing 4 when not in use. The host connector 6 is used to connect the power hub 2 to a USB host. In accordance with the USB standard, a USB host provides power to a downstream USB device.

Figure 1B:
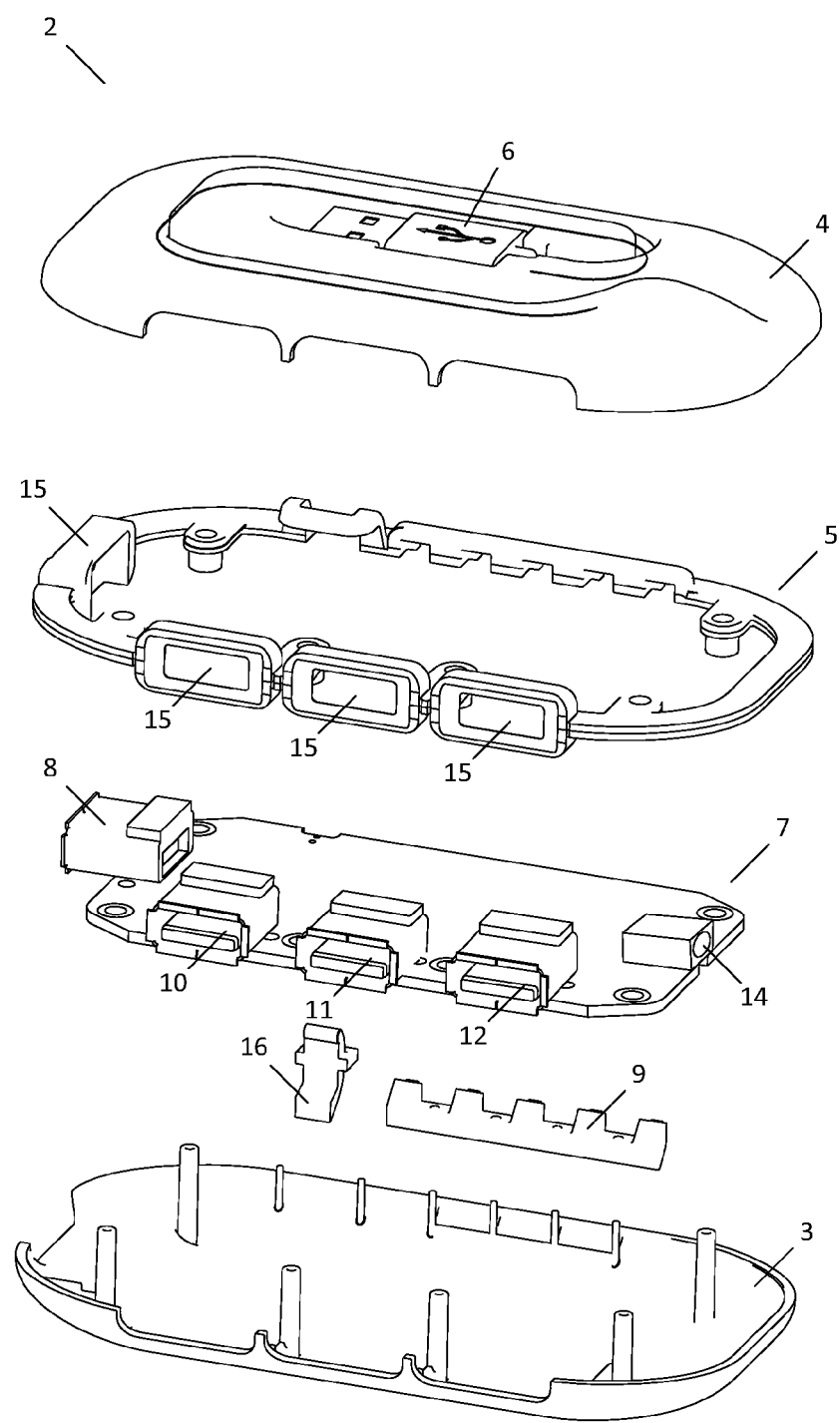

The center frame 5 has openings 15 for four downstream USB device connectors 8, 10, 11 and 12 which are mounted on the hub circuit board 7. The circuit board 7 contains hub circuitry that enables USB digital communications between a host connected to the host connector 6 and any downstream devices connected to the device connectors 8, 10, 11 and 12. The host connector 6 extending from the lower housing 4 is electrically connected to the hub circuit board 7. The circuit board 7 also has a DC jack 14 that can receive DC power from an external power supply. While a DC jack 14 is used in the embodiment of FIG. 1, any suitable external power supply connection can be used.

A button 16 mounted on the circuit board 7 extends through the housing and frame sections 3, 4 and 5 when they are coupled together. The button 16 is used to control an LED display 9 of the hub 2 which is also mounted on the circuit board 7 and extends through the housing and frame sections 3, 4 and 5. The LED display 9 displays the charge level of a hub battery mounted on the circuit board 7 in response to a user pressing the button 16. Also during charging, the LED display 9 flashes in sequence to indicate that the battery is being charged.

Figure 2:
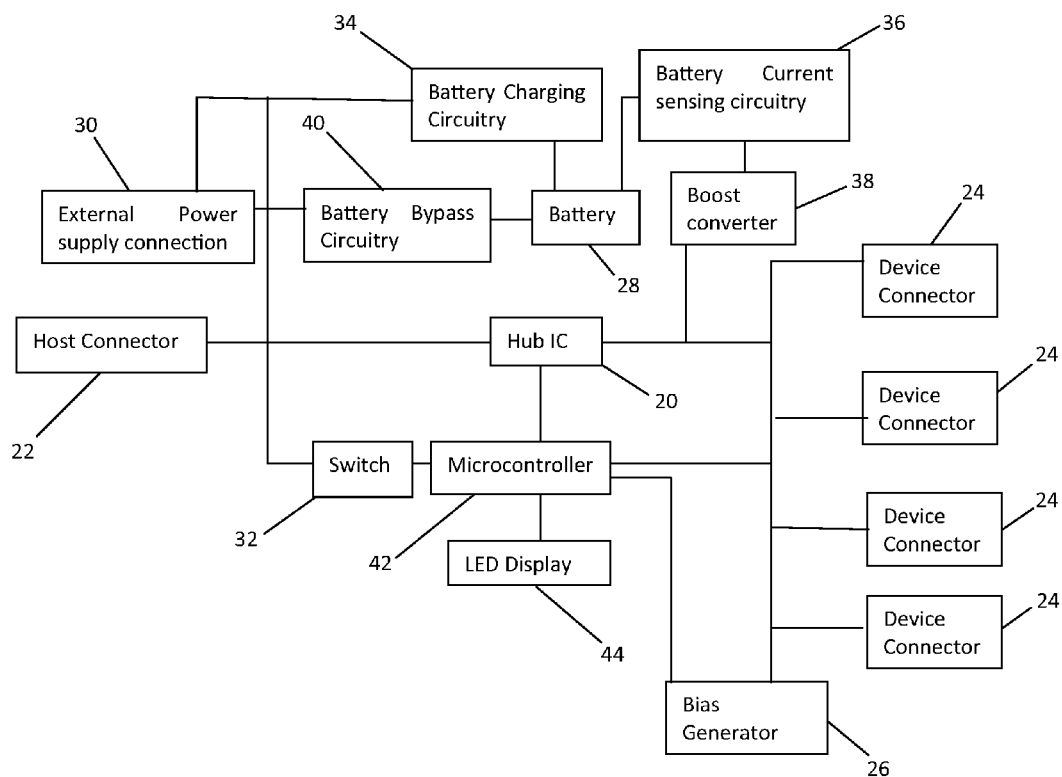
FIG. 2 is a block diagram of a power hub constructed in accordance with an embodiment of the present invention.

The circuit board 7 of the power hub illustrated in FIGS. 1(a) and (b) includes a number of major circuit subsections as shown in more detail in FIG. 2. One major circuit subsection is the hub circuitry which includes a USB 2.0 hub chip 20 with multi transaction translator functionality and it's supporting circuit components. The USB hub chip 20 enables USB communications between a host connected to an upstream USB host connector 22 and any USB device connected to one of the four downstream USB device connectors 24 of the power hub. This allows a user to attach as many as four downstream devices to a single USB host.

A microcontroller 42 is used to control the circuit functions of the power hub. The microcontroller 42 manages functions such as capacitive sensing of downstream devices connected to the device connectors 24, monitoring of the hub battery 28 charge level and host detection. The microcontroller 42 also controls the LED display 44 to display charging levels and status.

Another circuit subsection of the power hub is the circuitry needed to implement a D+/D− 2.0V bias generator 26 that provides conditioned power from a host or external power connection 30 for charging the power hub battery 28 and powering any downstream devices through a boost converter 38. The bias generator 26 preferably provides a 500 mA charging current that is appropriate for charging the hub battery 28 and powering electronic devices such as mobile phones, digital music players or other portable music players. While a 500 mA bias generator 26 is preferred, a 1 amp current, or any other desired current generator, can be used depending upon the application.

An external DC power connection 30 such as a DC jack and switch circuitry 32 is provided for switching the power hub between host USB power received on the host connector 22 and external DC power 30 which is preferably 5 VDC. Whenever external DC power 30 is available, it is preferably used since it does not reduce the power supplied by a host or drain the hub battery 28.

The hub battery 28 is preferably a lithium ion battery although other types of rechargeable power supplies can be used. A battery charging integrated circuit 34 conditions the power received from a host 22 or the external power supply connection 30 into the appropriate voltage and current for charging the hub battery 28. A current sensing integrated circuit 36 measures the battery current to determine the charge level of the hub battery 28. A DC-DC boost converter 38 generates a USB power supply voltage of 5V from the 2V Lithium ion hub battery 28 voltage to provide the proper voltage to power and/or charge downstream devices connected to the device connectors 24.

Battery bypass circuitry 40 functions to allow the power supply voltage to bypass the hub battery 28 and the boost converter 38 when the power is needed by downstream devices. The battery bypass circuitry 40 is used to directly power the downstream devices from the host 22 or external power supply 30 while bypassing the hub battery 28. This insures that sufficient power is available to the downstream devices.

Figure 3:
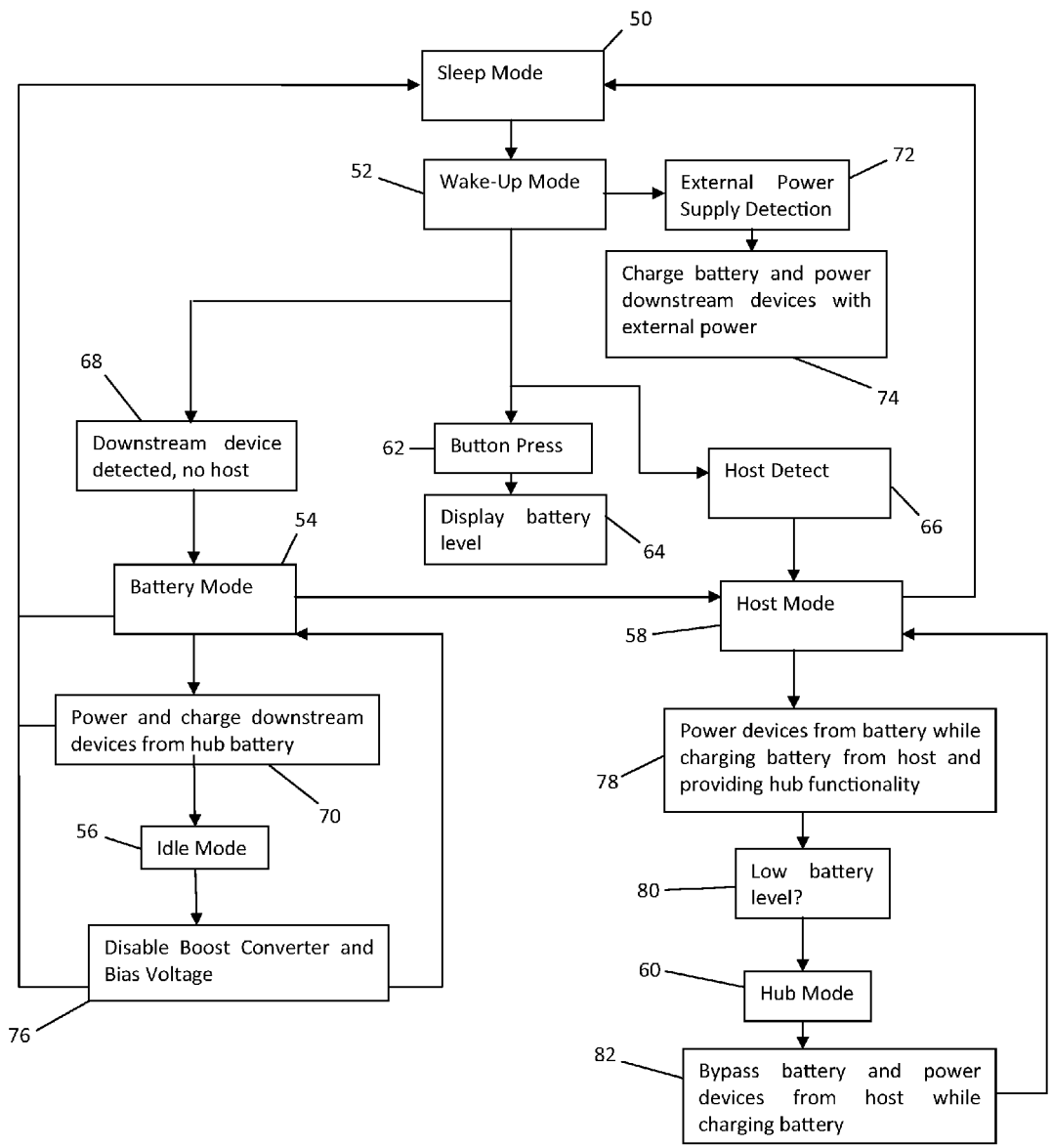
FIG. 3 is a flow chart of a method of operating a hub constructed in accordance with an embodiment of the invention.

Referring now to FIG. 3, a flow chart of a method of operating a hub constructed in accordance with an embodiment of the present invention is shown. The power hub preferably operates in one of six modes that include a sleep mode 50, a wake-up mode 52, battery mode 54, idle mode 56, host mode 58 or hub mode 60. In sleep mode 50, the power hub is in a state of very low power consumption waiting for an event that requires action to occur. In sleep mode 50, the hub circuitry is disabled with its power supply disconnected via FET's controlled by the microcontroller to prevent loading of a potential bias voltage for charging. The display LED's are also turned off and the battery charger, boost converter and bias voltage generator are disabled. While in sleep mode 50, the microcontroller of the power hub is monitoring for one of a number of events which can cause the power hub to exit or wake up out of sleep mode 50 and transition into wake-up mode 52.

One event that causes a transition from sleep mode 50 to a wake-up mode 52 is the activation of a hub user input. For example, pressing the input button on the power hub is received as an interrupt on change by the hub microcontroller and causes a transition of the power hub's state from sleep mode 50 to wake-up mode 52. A capacitive sensing event caused by detection of a capacitance change on one of the downstream USB ports by the microcontroller will also initiate a transition of the power hub's state from sleep mode 50 to wake-up mode 52. In addition, plugging the power hub into a USB host will cause an interrupt that initiates a transition of the power hub's state from sleep mode 50 to wake-up mode 52. Similarly, the plugging in of an external DC power supply will cause an interrupt on the change and cause the power hub to wake up.

In an especially preferred embodiment, if the hub battery's charge level is below 5% of capacity, then only plugging the power hub into a host or external DC power supply will wake the power hub from sleep mode 50, since only then is charging current is available to power the hub and recharge the battery. In such a situation, with a button press or capacitive sensing event, any device plugged in to the power hub would have to be powered from a substantially discharged battery, so the device is left in sleep mode 50 if these events happen when the battery is below a selected level.

Wake-up mode 52 is a transition mode from sleep mode 50 to one of the active modes, i.e. battery mode 54, host mode 58 or hub mode 60, depending upon the event that brought the device out of sleep mode 50. Upon sensing a wake-up event, the hub enters into wake-up mode 52 wherein the microcontroller determines the nature of the event. If the event was a button press 62, the device will light the appropriate LED's 64 to indicate the charge level of the battery. If the event was a plug-in event to a USB host 66, the device will transition into host mode 58. If the event was capacitive sense detection of a device on a downstream USB port 68, the power hub enables the boost converter and 2.0V bias generator and monitors the device current. If the current is greater than the wakeup threshold for 1 second the device transitions to battery mode 54. If the current remains below the wakeup threshold for 10 minutes and the power hub is not plugged into a host during this time, the power hub will transition back to sleep mode since the device does not need charging.

As discussed above, wake-up mode 52 can be triggered by plugging the power hub into an external DC power supply 72. In response to detecting an external power supply 72, the power hub uses the external power to charge the hub battery 74. The power hub also transitions to battery mode 54 wherein the hub battery of the power hub is used to power the hub and downstream devices. In battery mode 54, the power hub is not plugged into a USB host. If a host is detected, the power hub preferably enters a host mode 58 as discussed below. When in battery mode 54, the boost converter is enabled and outputs 5V to the USB power pin of each downstream USB port to charge any connected device(s) from the hub battery 70. The hub functions are also powered from the battery in battery mode 54. The D+/D− pins of each downstream port are preferably biased to 2.0V to in battery mode 54 to accommodate devices that require a bias voltage to charge when not connected to a host.

When in battery mode 54, pressing the button 62 will result in the battery charge level 64 of the battery of the power hub being displayed using the LEDs on the hub housing. The current output by the battery to the boost converter is monitored continuously by a current sense integrated circuit which feeds an analog to digital converter on the microcontroller. As any downstream devices are charged to capacity, their charge current will eventually taper off. When the charge current drops below a fixed threshold for 10 minutes, the microcontroller interprets this as the connected device(s) being fully charged and the hub re-enters sleep mode 50.

The battery voltage of the power hub battery is also monitored continuously. If the charge state of the battery drops below 10% a low-battery sequence will be flashed by the LED's. If the charge state of the battery drops below a selected charge level for a selected time period, preferably 5% for at least 1 second, the power hub re-enters sleep mode 50.

If the current output by the power hub battery exceeds an overcurrent threshold set in the firmware of the power hub when the hub is in battery mode 54, the power hub transitions from battery mode 54 to idle mode 56. In idle mode 56, the boost converter and charging 2.0V bias generator are disabled, as are the hub chip's power supply and the battery bypass path 76. After a set time period, the hub exits idle mode 56 and re-enters battery mode 54. The current output of the hub battery is then measured again to see if the overcurrent threshold is exceeded. If it is not, the hub remains in battery node 54. If the overcurrent threshold is still exceeded, the hub renters idle mode 56. Idle mode 56 is basically a fault state that disconnects power to the downstream ports until the battery discharge current is back below the overcurrent level.

In an especially preferred embodiment, the power hub enters sleep mode 50 if an external DC power supply is present, but the hub is not plugged into a USB host and no downstream devices are plugged in, or are plugged in and have just reached full charge. If these conditions are detected, the power hub will transition from battery mode 54 back to sleep mode 50 since there is no reason to continue further charging.

Another manner in which the power hub can exit battery mode 54 is when the upstream USB cable of the power hub is plugged into a USB host. This plugging in will be detected by the microcontroller and the device will transition from battery mode 54 into host mode 58.

Another variation within battery mode 54 includes the case where an external DC power supply is connected to the power hub while the hub is in battery mode 54. In this case, the downstream devices are charged through the battery bypass path and the boost converter is turned off. The 2.0V bias voltage is enabled. The battery charger is on and charging the hub battery at 500 mA. If the external DC supply is removed, the boost converter turns on and the power hub device operates as if it just entered battery mode 54. This provides a path for the device to return to sleep mode 50. As long as the external DC supply is plugged in the device will remain in battery mode 54 unless it is plugged into a host and not return to sleep mode 50.

The power hub enters host mode 58 when the microcontroller detects that a host 66 has been connected to the host port of the power hub. In host mode 58, the upstream port of the power hub is connected to a USB host, the downstream devices are powered from the internal battery via the boost converter, the battery is charged by the host and the hub utilizes its hub functionality 78. If external DC power is present, the hub enumerates to the host that it is self-powered. This will allow downstream devices that require more power, and may require a self-powered hub, to be able to enumerate with the host.

When in host mode 58, pressing the power hub button 62 reads out the battery charge level 64 using the LED's. If an external power supply connection is unavailable, the hub battery is charged by the host in host mode 58. Depending on the current being pulled from the hub by the downstream devices, the battery charger can set to charge the hub battery at one of a number of selected current levels, such as either 300 mA or 500 mA, to insure that sufficient host supplied power is available for the downstream devices. If there are devices attached and they are pulling enough current from the power hub to exceed a selected current threshold, the charge current for the hub battery is limited to a lower current level to insure sufficient current is available from the host to power the power hub chips for communication. If the downstream current is below this threshold, it is assumed that no downstream devices are plugged in so the battery takes the full 500 mA from the host. Multiple thresholds can be implemented through the firmware and current limits set to a number of different levels 100 mA, 300 mA or 500 mA depending upon the implementation. In addition, if the battery is charged above a specified level, power can be provided from both the battery and the host to the downstream devices.

As long as the hub battery's charge level is above 10%, the LED's display in a ramp to indicate the battery is charging. In host mode 58, if there is no external DC power attached and the battery charge level is below 10% of capacity, an overcurrent flag is generated and output to the hub circuit and an LED sequence is flashed to inform the user that the hub battery is getting low. In host mode, the host detect input I/O is monitored and, if the hub battery is unplugged from the host and the I/O is low for at least 300 ms, the hub battery will transition from host mode 58 to battery mode 54.

If the power hub is plugged into an external DC power source while already in host mode 58, the boost converter is preferably turned off and the battery bypass path is turned on with the charger set for a 300 mA charge rate. All of the current for the downstream ports, hub operation and the battery charge current then comes from the external DC power supply instead of the host.

As soon as the battery charge level is 5% or less of capacity 80, the device transitions from host mode 58 to hub mode 60 and the overcurrent flag is set on the hub integrated circuit. When the hub enters hub mode 60, it activates the battery bypass circuitry and powers any downstream devices from the host while charging the battery 82. In hub mode 60, with no external DC supply, the power hub is strictly a bus powered hub with the added functionality that it can also recharge the hub battery. Power is being routed to the hub chip via the battery bypass switch and not from the boosted battery voltage. The power hub enters hub mode 60 when the battery charge level drops below 5% of capacity and it remains in hub mode 60 until the battery level is back up to at least 50% of capacity. In hub mode 60, the boost converter is turned off and the battery bypass circuitry is turned on so any downstream devices are powered directly from the host. The charging current for the battery in hub mode 60 is set to a minimum level such as 100 mA. Pressing the button 62 reads out the battery charge level 64 using the LEDs in hub mode 60. If, while in hub mode 60, the battery capacity reaches at least 50% charge, the power hub automatically transitions from hub mode 60 back to host mode 58.

Detection of a battery discharge overcurrent can also cause the power hub to transition from host mode 58 to hub mode 60. If a battery discharge overcurrent is detected, this overcurrent is reported to the hub chip which communicates it to the host. The host detect input I/O is monitored and if the power hub is unplugged from the host and the I/O is low for at least 300 ms, the power hub transitions from hub mode 60 to battery mode 54.

If an external DC power supply is connected to the power hub while in hub mode 60, the boost converter remains off and the battery bypass on. The DC power supply provides power for the hub integrated circuit, downstream ports and battery charger. The charger is set to charge the battery at a specified level such as 300 mA. There is preferably a polyfuse in the battery bypass path so if there is ever an overcurrent/short circuit in either host mode 58 or hub mode 60 through this path, the polyfuse will trip. A voltage divider on the downstream side of the polyfuse trips low to signal to the microcontroller the overcurrent condition. The microcontroller then turns off the battery bypass path and signals the overcurrent to the hub circuit.

Hub mode 60 is particularly useful in an embodiment that lacks an external power supply connection such as a DC power jack. The hub mode 60 allows the power hub to function as a hub even when the battery is completely depleted. This is the primary function of the host mode 58 to hub mode 60 transitions. This mode also allows a product incorporating the power hub to be packaged without a DC power supply without significantly limiting its functionality. As long as DC power is plugged into power hub, the device will never have to go into hub mode 60. However if the supply is accidentally unplugged or the user begins to use the power hub without a DC supply, then the device can alternate between hub mode 60 and host mode 58 depending on the charge state of the battery.

Figure 4:
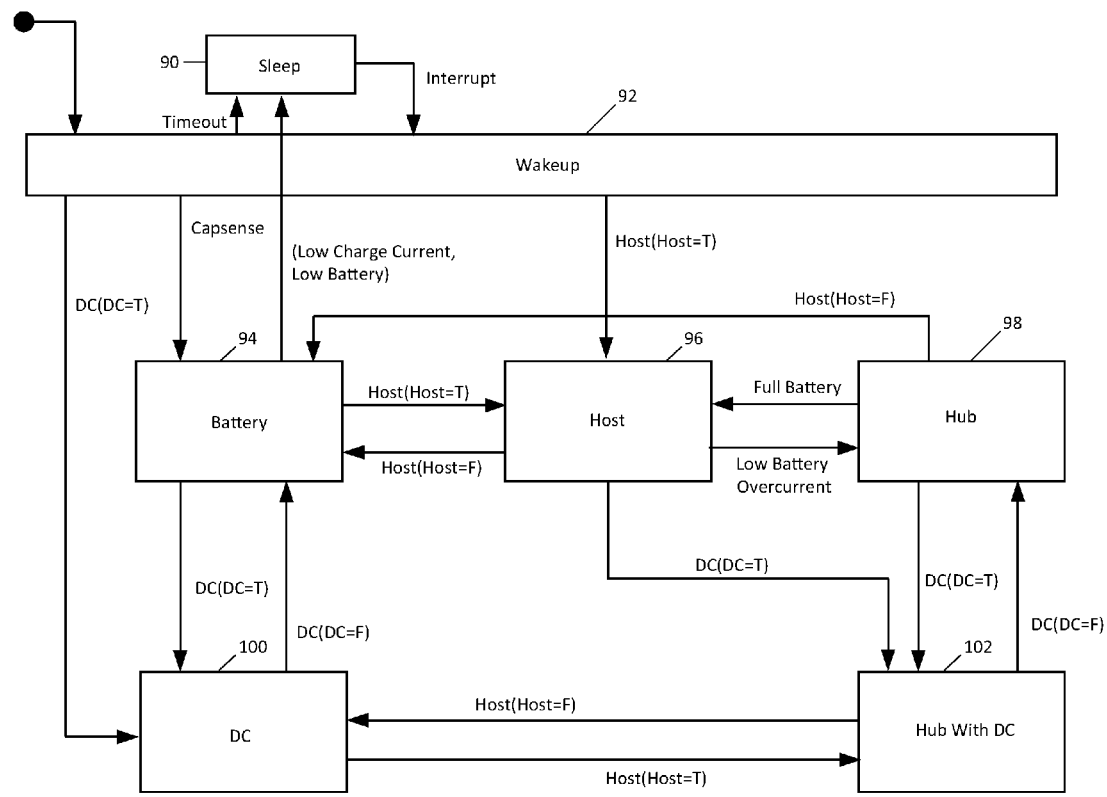
FIG. 4 is a detailed state diagram of a method of operating a hub in accordance with an embodiment of the invention.

FIG. 4 is a detailed state diagram of a method of operating a hub in accordance with an embodiment of the invention. The exact operating sequence can vary depending upon the desired functionality and complexity. The particular operating method referred to in FIG. 4 conceptually has eight operating modes, sleep mode 90, wakeup mode 92, battery mode 94, host mode 96, hub mode 98, DC mode 100 and Hub w/DC mode 102. Upon entering each operating mode, a number of entry actions are taken before beginning the state action. The preferred settings for the states shown in FIG. 4 are set forth below.

Sleep Mode 90
   Entry Actions:
   Battery Bypass=Off
   Battery Charger=Off
   Boost Enable=Off
   Hub Chip Reset=On
   Hub Chip Power=Off
   Self Powered=On
   Port Bias Voltage=Off
   Configure ports for low current
   Setup interrupts
   State Actions:
   Sleep Wakeup Mode 92
   Entry Actions:
   Battery Bypass=Off
   Battery Charger=Off
   Boost Enable=Off
   Hub Chip Reset=On
   Hub Chip Power=Off
   Self Powered=On
   Port Bias Voltage=Off Battery Mode 94
   Entry Actions:
   Battery Bypass=Off
   Battery Charger=Off
   Boost Enable=On
   Hub Chip Reset=On
   Hub Chip Power=Off
   Self Powered=On
   Port Bias Voltage=On
   State Actions:
   handle over current condition
   flash LEDs if battery is below 10%
   Measure charge current to device
   Go to sleep if no charging needed
   Measure battery charge and go to sleep if low Host Mode 96
   Entry Actions:
   Battery Bypass=Off
   Battery Charger=On
   Boost Enable=On
   Hub Chip Reset=Off
   Hub Chip Power=On
   Self Powered=On
   Port Bias Voltage=Off
   State Actions:
   Charge battery—calculate charge current
   battery below 10%—flash LEDs, set
   overcurrent flag on hub chip Hub Mode 98
   Entry Actions:
   Battery Bypass=On
   Battery Charger=On
   Boost Enable=Off
   Hub Chip Reset=Off
   Hub Chip Power=On
   Self Powered=Off
   Port Bias Voltage=Off
   State Actions:
   Charge battery (100 mA)

DC Mode 100
   Entry Actions:
   Battery Bypass=On

Battery Charger=On
Boost Enable=Off
Hub Chip Reset=On
Hub Chip Power=Off
Self Powered=On
Port Bias Voltage=On
State Actions:
Charge Battery (500 mA)
Hub w/DC Mode 102
  Entry Actions:
  Battery Bypass=On
  Battery Charger=On
  Boost Enable=Off
  Hub Chip Reset=Off
  Hub Chip Power=On
  Self Powered=On
  Port Bias Voltage=Off
  State Actions:
  Charge battery (300 mA)

While the above operating method is preferred, the invention is not limited to the particular operating modes or circuit components discussed. The power hub of the present invention is beneficial in that keeps the internal hub battery charged for portable power while providing hub functionality. While the invention has been discussed with respect to a USB hub, those skilled in the art will appreciate that the features of the invention have application in a variety of applications. Thus, although there has been described a particular embodiment of the present invention of a new and useful POWER HUB, it is not intended that reference to preferred constructions be construed as limitations upon the scope of this invention except as set forth in the following claims.

What is claimed is:

1. A power hub comprising:
   a housing;
   a host connector positioned on said housing wherein said host connector is adapted to be coupled to a host device and receive a host power supply voltage from said host device;
   at least two device connectors positioned on said housing wherein each of said device connector is adapted to be coupled to an electronic device and provide a power supply voltage to said electronic device;
   a rechargeable battery in said housing;
   a hub circuit that connects both of said device connectors to said host connector such that a host device connected to said host connector can communicate digital data with an electronic device connected to one of said device connectors;
   a microcontroller that controls said hub such that power for said hub circuit, rechargeable battery and device connectors is provided from a host device if a host device is connected to the host connector and power for an electronic device connected to one of said device connectors is provided from said rechargeable battery if no host is connected to the host connector; and
   a battery bypass circuit for bypassing said rechargeable battery if a charge level of said rechargeable battery falls below a threshold level and no external power is available;
   wherein said rechargeable battery is charged from a host device connected to said host connector only when a power current drawn by any electronic devices connected to said device connectors is below a specified threshold.

2. The power hub of claim 1 further comprising an external power supply connection wherein said microcontroller uses said external power supply connection to power said hub circuit, recharge said rechargeable battery and power any said electronic devices coupled to said device connectors when said external power supply connection is connected to an external power supply.

3. The power hub of claim 1 wherein said host connector and device connectors further comprise USB connectors.

4. The power hub of claim 1 wherein said microcontroller charges said rechargeable battery when said microcontroller detects that said power hub has been connected to an external power supply or a host device.

5. The power hub of claim 1 wherein said housing further comprises an upper housing and a lower housing mounted on a central frame.

6. A hub for connecting a host device to a plurality of downstream devices, said hub comprising:
   a rechargeable power supply;
   a host connector adapted to couple to said host device;
   at least two device connectors each adapted to couple to a downstream device;
   a battery bypass circuit for bypassing said rechargeable battery when a current drawn by a downstream device exceeds a current threshold; and
   a battery bypass circuit for bypassing said rechargeable battery if a charge level of said rechargeable battery falls below a threshold level and no external power is available;
   wherein said rechargeable power supply is recharged when a host is connected to the host, connector and wherein said rechargeable power supply can supply power to a downstream device when a host is not connected to said host connector.

7. The hub of claim 6 wherein said host and device connectors are USB connectors.

8. The hub of claim 6 further comprising a boost converter for converting a battery voltage into a downstream device voltage.

9. The hub of claim 6 further comprising an external power supply connection.

10. The hub of claim 9 wherein said hub charges said rechargeable battery and powers said downstream devices with power from said external power supply connection when external power is available.

11. The hub of claim 6 further comprising an LED display and button wherein said LED display displays a charge level for said rechargeable battery when said button is pressed.

12. A method of operating a hub having a host connector, at least two device connectors, a rechargeable battery and an external power supply connection contained in a housing, said method comprising:
    detecting if external power is available from said external power supply connection and, if external power is available, powering said hub, charging said rechargeable battery and powering any devices connected to said device connectors with said external power;
    if no external power is available, detecting if host power is available from said host connector and, if host power is available, powering said hub, charging said rechargeable battery and powering any devices connected to said device connectors with said host power;
    monitoring a current level provided to downstream devices connected to said device connectors by said hub and stopping charging of said rechargeable battery when said current level exceeds a threshold level;
    if no external power or host power is available, powering said hub and any devices connected to said device connectors with said rechargeable battery; and placing said hub into a sleep mode whereby said rechargeable battery is disconnected from said hub if a charge level of said rechargeable battery falls below a threshold level and no external, power or host power is available.

13. The method of claim 12 further comprising the step of enabling digital communications between a host connected to said host connector and at least two devices connected to said device connectors.

14. The method of claim 12 wherein said device connectors and said host connector further comprise USB connectors.

15. The method of claim 12 further comprising the step of enabling USB digital communications between a host connected to said host connector and at least two devices connected to said device connectors.

16. The method of claim 12 further comprising the step of displaying a charge level of said rechargeable battery in response to a user input.

\* \* \* \* \*